United States Patent
Pendap et al.

(10) Patent No.: US 8,515,945 B2
(45) Date of Patent: Aug. 20, 2013

(54) PARALLEL PARTITIONING INDEX SCAN

(75) Inventors: Santosh Pendap, Fremont, CA (US);
Sudipto Chowdhuri, San Ramon, CA (US); Peter J. Schneider, Dublin, CA (US)

(73) Assignee: Sybase, Inc., Dublin, CA (US)

( * ) Notice: Subject to any disclaimer, the term of this patent is extended or adjusted under 35 U.S.C. 154(b) by 0 days.

(21) Appl. No.: 12/947,303

(22) Filed: Nov. 16, 2010

(65) Prior Publication Data

US 2012/0124045 A1     May 17, 2012

(51) Int. Cl.
*G06F 7/00* (2006.01)

(52) U.S. Cl.
USPC ............ 707/714; 707/713; 707/715; 707/737

(58) Field of Classification Search
USPC .................. 707/713, 714, 715, 737
See application file for complete search history.

(56) References Cited

U.S. PATENT DOCUMENTS

| | | | |
|---|---|---|---|
| 5,857,180 A | 1/1999 | Hallmark et al. | |
| 6,349,310 B1 | 2/2002 | Klein et al. | |
| 2006/0047622 A1* | 3/2006 | Folkert et al. | 707/1 |
| 2006/0218123 A1* | 9/2006 | Chowdhuri et al. | 707/2 |
| 2006/0253429 A1* | 11/2006 | Raghavan et al. | 707/2 |
| 2007/0078813 A1* | 4/2007 | Beavin et al. | 707/2 |
| 2009/0119247 A1* | 5/2009 | Bellamkonda et al. | 707/2 |
| 2010/0161565 A1 | 6/2010 | Lee et al. | |

FOREIGN PATENT DOCUMENTS

JP     2010-061604 A     3/2010

OTHER PUBLICATIONS

English-Language Abstract for Japanese Patent Publication No. 2010-061604 A, published Mar. 18, 2010, from http://worldwide.espacenet.com; 1 page.

International Search Report and the Written Opinion of the International Searching Authority directed to related International Patent Application No. PCT/US2011/059877, mailed Apr. 10, 2012, from the Korean Intellectual Property Office; 8 pages.

English language Abstract for Japanese Patent Publication No. JP 2010/061604 A, European Patent Office, Espacenet Database, http://worldwide.espacenet.com (listed as document FP2 on the accompanying form PTO/SB/08a).

International Preliminary Report on Patentability and Written Opion of the International Searching Authority for International Patent Application No. PCT/US2011/059877, Korean Intellectual Property Office, Republic of Korea, mailed on May 30, 2013, 5 pages.

* cited by examiner

*Primary Examiner* — Apu Mofiz
*Assistant Examiner* — Cindy Nguyen
(74) *Attorney, Agent, or Firm* — Sterne, Kessler, Goldstein & Fox PLLC (57) ABSTRACT

System, methods and articles of manufacture for joining data in the database tables comprising, performing an index scan on a global index of a first database table, determining rows in the first database table that may be joined with a second database table based on a needed partitioning, wherein the needed partitioning is determined using an index scan, determining a number of partitions in the second database table, and joining each of the corresponding partitions in the first database table with a corresponding partitions in the second database table.

18 Claims, 5 Drawing Sheets

PARALLEL PARTITIONING INDEX SCAN

BACKGROUND OF THE INVENTION

1. Field of the Invention

The invention relates generally to database management system optimization, and more specifically to joining database tables that are partitioned on different attributes or have different number of partitions or partitioned according to a different partitioning scheme.

2. Description of the Background Art

Computer database management systems have become a prevalent means for data storage and retrieval. A database will commonly access the underlying data using a database server system. A client issues a query to the database management system that conforms to a defined query language. This simplifies the client's interaction with the database by not requiring that the client know or understand the underlying structure of the physical database. Because of this, however, it is imperative that the database management system generate and execute the query in a manner which is most efficient for the underlying database.

The database management systems achieve a significant increase in performance by storing data in partitioned database tables. Partitioned database tables allow a query optimizer to generate a query plan that can access data in a particular database table partition rather than the entire database table. However, when the database management system receives a query that joins database tables that are partitioned sub-optimally on attributes that are not a sub-set of columns in the equi-join predicates or have a mismatch in partitioning in terms of the type and number of partitions between the tables, the conventional query optimizer performs a repartition operation on one or both sides of the join operation. The repartition operation typically repartitions the partitions in one or both database tables to match the needed partitioning based on the join predicates and the partitioning of the database tables. The resultant analysis requires a process that re-partitions one or both tables. Such repartition operations are expensive and are likely to decrease the performance of the database management system.

Therefore, what is needed are systems and methods where the database management system is operable to execute a join operation (and/or other database operations) on database tables with an algorithm that allows optimized repartitioning of the data in at least one table prior to the join operation.

BRIEF SUMMARY OF THE INVENTION

Embodiments of the invention include a method comprising performing an index scan on a global index of a first database table, determining rows in the first database table that may be joined with a second database table based on a needed partitioning; wherein the needed partitioning is determined using an index scan; and joining each of the corresponding partitions in the first database table with a corresponding partitions in the second database table.

Embodiments of the invention additionally include a database management system for joining database tables comprising an optimization module configured to perform an index scan on a global index of a first database table, determine rows in the first database table that may be joined with rows in a partition in a second database table based on the needed partitioning, and join each of the corresponding partitions in the first database table with a corresponding partitions in the second database table.

Embodiments of the invention further include an article of manufacture including a computer-readable medium having instructions stored thereon that, when executed by a computing device, cause the computing device to perform operations comprising performing an index scan on a global index of a first database table, determining rows in the first database table that may be joined with a second database table based on a needed partitioning, wherein the needed partitioning is determined using an index scan, determining a number of partitions in the second database table, and joining each of the corresponding partitions in the first database table with a corresponding partitions in the second database table.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to a person skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the invention and, together with the description, further serve to explain the principles of the invention and to enable a person skilled in the relevant art to make and use the invention.

The invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION OF THE INVENTION

1. Introduction

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

Figure 1:
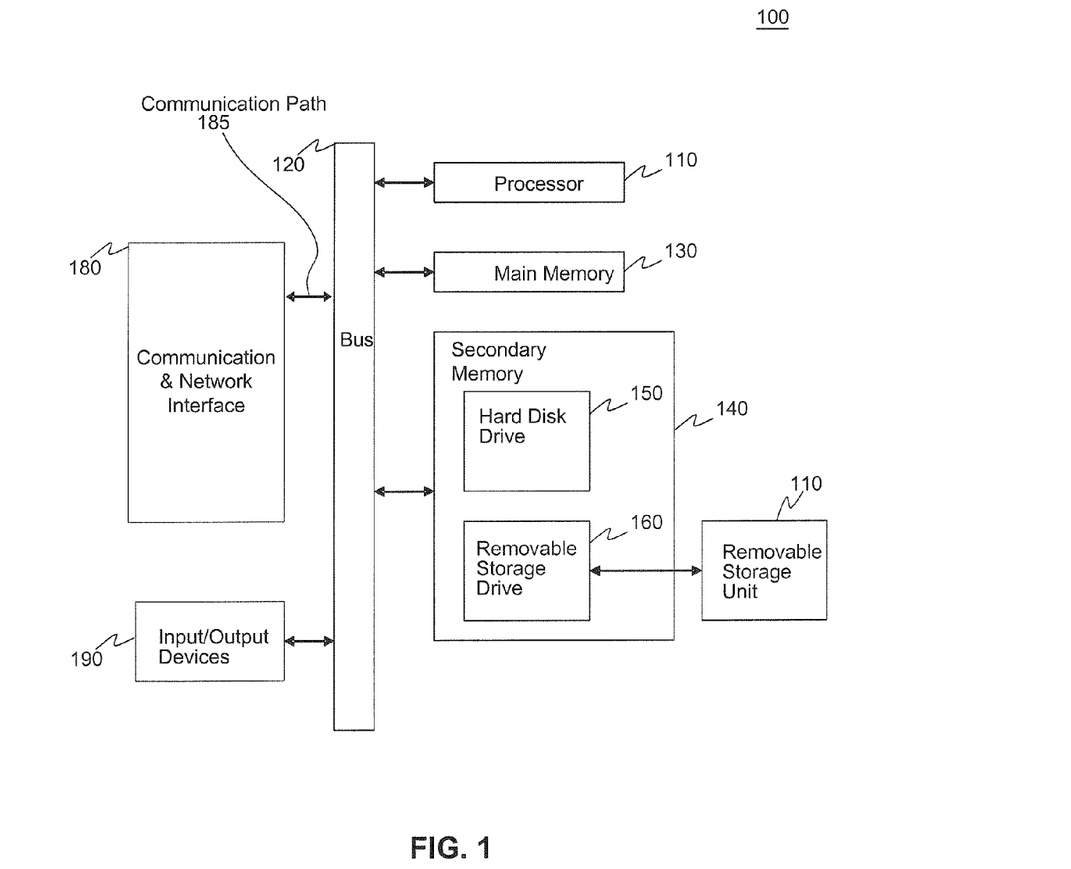
FIG. 1 is an exemplary operating environment 100 for sharing data among nodes, according to embodiments of the invention.

Various aspects of the invention can be implemented by software, firmware, hardware, or a combination thereof. FIG. 1 illustrates an example computer system 100 in which the invention, or portions thereof, can be implemented as computer-readable code. For example, the methods illustrated by flowcharts described herein can be implemented in system 100. Various embodiments of the invention are described in terms of this example computer system 100. After reading this description, it will become apparent to a person skilled in the relevant art how to implement the invention using other computer systems and/or computer architectures.

Computer system 100 includes one or more processors, such as processor 110. Processor 110 can be a special purpose or a general purpose processor. Processor 110 is connected to a communication infrastructure 120 (for example, a bus or network).

Computer system 100 also includes a main memory 130, preferably random access memory (RAM), and may also include a secondary memory 140. Secondary memory 140 may include, for example, a hard disk drive 150, a removable storage drive 160, and/or a memory stick. Removable storage drive 160 may comprise a floppy disk drive, a magnetic tape drive, an optical disk drive, a flash memory, or the like. The removable storage drive 160 reads from and/or writes to a removable storage unit 170 in a well known manner. Removable storage unit 170 may comprise a floppy disk, magnetic tape, optical disk, etc. which is read by and written to by removable storage drive 160. As will be appreciated by persons skilled in the relevant art(s), removable storage unit 170 includes a computer usable storage medium having stored therein computer software and/or data.

In alternative implementations, secondary memory 140 may include other similar means for allowing computer programs or other instructions to be loaded into computer system 100. Such means may include, for example, a removable storage unit 170 and an interface (not shown). Examples of such means may include a program cartridge and cartridge interface (such as that found in video game devices), a removable memory chip (such as an EPROM, or PROM) and associated socket, and other removable storage units 170 and interfaces which allow software and data to be transferred from the removable storage unit 170 to computer system 100.

Computer system 100 may also include a communications and network interface 180. Communications interface 180 allows software and data to be transferred between computer system 100 and external devices. Communications interface 180 may include a modem, a communications port, a PCMCIA slot and card, or the like. Software and data transferred via communications interface 180 are in the form of signals which may be electronic, electromagnetic, optical, or other signals capable of being received by communications interface 180. These signals are provided to communications interface 180 via a communications path 185. Communications path 185 carries signals and may be implemented using wire or cable, fiber optics, a phone line, a cellular phone link, an RF link or other communications channels.

The network interface 180 allows the computer system 100 to communicate over communication networks or mediums such as LANs, WANs the Internet, etc. The network interface 180 may interface with remote sites or networks via wired or wireless connections.

In this document, the terms "computer program medium" and "computer usable medium" are used to generally refer to media such as removable storage unit 170, removable storage drive 160, and a hard disk installed in hard disk drive 150. Signals carried over communications path 185 can also embody the logic described herein. Computer program medium and computer usable medium can also refer to memories, such as main memory 130 and secondary memory 140, which can be memory semiconductors (e.g. DRAMs, etc.). These computer program products are means for providing software to computer system 100.

Computer programs (also called computer control logic) are stored in main memory 130 and/or secondary memory 140. Computer programs may also be received via communications interface 180. Such computer programs, when executed, enable computer system 100 to implement embodiments of the invention as discussed herein. In particular, the computer programs, when executed, enable processor 110 to implement the processes of the invention, such as the steps in the methods illustrated by flowcharts discussed above. Accordingly, such computer programs represent controllers of the computer system 100. Where the invention is implemented using software, the software may be stored in a computer program product and loaded into computer system 100 using removable storage drive 160, interfaces, hard drive 150 or communications interface 180, for example.

The computer system 100 may also include input/output/display devices 190, such as keyboards, monitors, pointing devices, etc.

The invention is also directed to computer program products comprising software stored on any computer useable medium. Such software, when executed in one or more data processing device(s), causes a data processing device(s) to operate as described herein. Embodiments of the invention employ any computer useable or readable medium, known now or in the future. Examples of computer useable mediums include, but are not limited to primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

The invention can work with software, hardware, and/or operating system implementations other than those described herein. Any software, hardware, and operating system implementations suitable for performing the functions described herein can be used.

Figure 2:
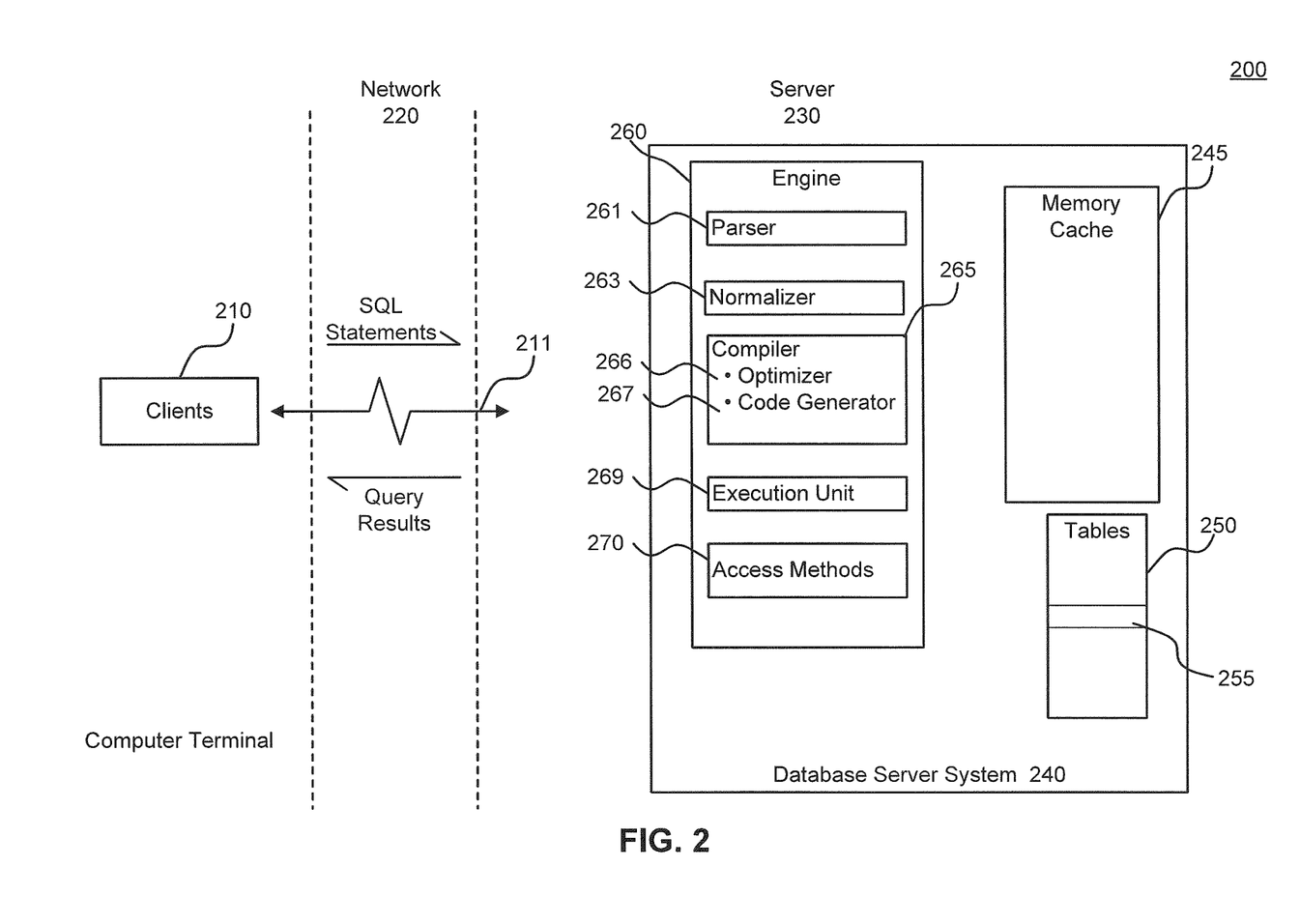
FIG. 2 is an exemplary database computing environment 200 in which embodiments of the invention may be implemented.

While the invention may operate within a single (standalone) computer (e.g., system 100 of FIG. 1), the present invention may also be embodied in a multi-user computer system, such as a client/server system. FIG. 2 illustrates the general structure of a client/server database system 200 suitable for implementing the present invention. (Specific modifications to the system 200 for implementing methodologies of the present invention are described in subsequent sections below.) As shown, the system 200 comprises one or more client(s) 210 connected to a server 230 via a network 220. Specifically, the client(s) 210 comprise one or more standalone terminals connected to a Database Management System 240 ("DBMS") using a conventional network. In an exemplary embodiment, the terminals may themselves comprise a plurality of standalone workstations, dumb terminals, or the like, or comprise personal computers (PCs) such as the above-described system 100. Typically, such units would operate under a client operating system, such as a Microsoft® Windows client operating system (e.g., Microsoft® Windows 95/98, Windows 2000, Windows XP, Windows Vista or Windows 7).

The database server system 240, which comprises Sybase® Adaptive Server®Enterprise (ASE) (available from Sybase, Inc. of Dublin, Calif.) in an exemplary embodiment, generally operates as an independent process (i.e., independently of the clients), running under a server operating system such as Microsoft® Windows NT, Windows 2000, Windows XP, Windows Vista and Windows 7 (all from Microsoft Corporation of Redmond, Wash.), UNIX (Novell), Solaris (Sun), or Linux (Red Hat). The network 220 may be any one of a number of conventional network systems, including a Local Area Network (LAN) or Wide Area Network (WAN), as is known in the art (e.g., using Ethernet, IBM Token Ring, or the like). The network 220 includes functionality for packaging client calls in the well-known Structured Query Language (SQL) together with any parameter information into a format (of one or more packets) suitable for transmission to the database server system 240. The described computer hardware and software are presented for purposes of illustrating the basic underlying desktop and server computer components that may be employed for implementing the present invention. For purposes of discussion, the following description will present examples in which it will be assumed that there exist multiple server instances (e.g., database server nodes) in a cluster that communicate with one or more "clients" (e.g., personal computers or mobile devices). The present invention, however, is not limited to any particular environment or device configuration. Instead, the present invention may be implemented in any type of system architecture or processing environment capable of supporting the methodologies of the present invention presented in detail below.

Client/server environments, database servers, and networks are well documented in the technical, trade, and patent literature. In operation, the client(s) 210 store data in, or retrieve data from, one or more database tables 250, as shown at FIG. 2. Data in a relational database is stored as a series of tables, also called relations. Typically resident on the server 230, each table itself comprises one or more "rows" or "records" (tuples) (e.g., row 255 as shown at FIG. 2). A typical database will contain many tables, each of which stores information about a particular type of entity. A table in a typical relational database may contain anywhere from a few rows to millions of rows. A row is divided into fields or columns; each field represents one particular attribute of the given row. A row corresponding to an employee record, for example, may include information about the employee's ID Number, Last Name and First Initial, Position, Date Hired, Social Security Number (SSN), and Salary. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed. Thus, a typical record includes several categories of information about an individual person, place, or thing. Each row in a table is uniquely identified by a record ID (RID), which can be used as a pointer to a given row.

Most relational databases implement a variant of the Structured Query Language (SQL), which is a language allowing users and administrators to create, manipulate, and access data stored in the database. The syntax of SQL is well documented; see, e.g., the above-mentioned "An Introduction to Database Systems". SQL statements may be divided into two categories: data manipulation language (DML), used to read and write data; and data definition language (DDL), used to describe data and maintain the database. DML statements are also called queries. In operation, for example, the clients 210 issue one or more SQL commands to the server 230. SQL commands may specify, for instance, a query for retrieving particular data (i.e., data records meeting the query condition) from the database table(s) 250. In addition to retrieving the data from database server table(s) 250, the clients 210 also have the ability to issue commands to insert new rows of data records into the table(s), or to update and/or delete existing records in the table(s).

SQL statements or simply "queries" must be parsed to determine an access plan (also known as "execution plan" or "query plan") to satisfy a given query. In operation, the SQL statements received from the client(s) 210 (via network 220) are processed by the engine 260 of the DBMS 240. The engine 260 itself comprises a parser 261, a normalizer 263, a compiler 265, an execution unit 269, and access method(s) 270. Specifically, the SQL statements are passed to the parser 261 which employs conventional parsing methodology (e.g., recursive descent parsing). The parsed query is then normalized by the normalizer 263. Normalization includes, for example, the elimination of redundant data. Additionally, the normalizer 263 performs error checking, such as confirming that table names and column names which appear in the query are valid (e.g., are available and belong together). Finally, the normalizer 263 can also look-up any referential integrity constraints which exist and add those to the query.

After normalization, the query is passed to the compiler 265, which includes an optimizer 266 and a code generator 267. The optimizer 266 performs a cost-based analysis for formulating a query plan that is reasonably close to an optimal plan. The code generator 267 translates the query plan into executable form for execution. The execution unit 269 executes the query plan using the access methods 270.

In order to increase performance for processing queries, a database management system, such as DBMS 240, may partition database tables. Partitioning database tables is a technique where DBMS 240 divides large tables into partitions or smaller segments using a deterministic partitioning function that partitions a table T into P partitions, where $f(col1, col2, \ldots col_M)=k$, for a given row $R(col1, col2, \ldots, col_N)$ such that $M<=N$ and $0<=k<=(P-1)$. When optimizer 266 optimizes a partitioned database table, optimizer 266 will try to join a given partition of one database table to the corresponding partition in another database table, thereby avoiding joining the entire tables. As a result, the query executes faster because optimizer 266 generates an access plan that accesses data corresponding to the database table partition, rather than data corresponding to the entire database table.

There are numerous ways to partition data in database tables. A non-exhaustive, non-limiting list includes range partitioning and hash partitioning.

In range partitioning, the database table is partitioned based on a range of values. The range of values are attributes in one or more columns in the database table. In an exemplary embodiment, a column "Age" in the database table contains data pertaining to a person's age. The column may be partitioned into three partitions, where each database table partition includes a range for a specific age, such as, but not limited to, partition I containing children ages 1-18, partition II containing adults ages 19-64, and partition III containing adults ages 65 and over.

Another way to partition data in database tables is by hash partitioning. Hash partitioning distributes data to database table partitions based on the outcome of the hash function. A hash function is applied on the data in a particular column in the database table. In an exemplary embodiment described herein, column "Age" may be partitioned into three partitions by applying the hash function to each attribute in the column. A hash function generates a result which identifies the database table partition that contains the attribute. For example, in a non-limiting example, the hash function may generate a result=0 for partition I, result=1 for partition II, and result=2 for partition III.

A person skilled in the art would appreciate and understand how to partition data in database tables using range partitioning and hash partitioning, as well as by using other techniques.

In an embodiment, database management system, such as DBMS 240, accesses data in database table partitions by using a local index and a global index. The local index is used to manage data in a particular partition in the database table. The local index does not have any knowledge of data outside the partition in the database table that the local index manages.

Unlike local indexes, a global index can access all database table partitions in the database table. The database management system, such as DBMS 240, is operable to use the global index to access data in any partition in a given database table.

In an instance when the client 210 sends a query that requires a join operation on database tables that are partitioned using different columns, a conventional DBMS executes a re-partitioning operation, such as, but not limited to, a repartition exchange described herein. Alternatively, a conventional DBMS executes the query using a serial query plan. Both operations are expensive because they do not exploit the properties of the partitioned database tables or parallel processing and therefore result in poor performance and client response time.

An exemplary embodiment of a join operation (|X|) includes, but is not limited to, A|X|B on a1=b1, where:
Table A ("A") includes columns a1, a2 and a3. Table A is partitioned on column a2 making it incompatible for the join operation on a1=b1; and
Table B ("B") includes columns b1, b2, and b3. Table B is partitioned on column b1, making this partitioning compatible for the join operation on a1=b1.

The repartition exchange operation, repartitions the data in the first database table (Table A) so that partitions in the first database table match partitions in the second database table (Table B). Once the first database table is repartitioned, a conventional DBMS joins the first database table and the second table using a partition to partition joining technique. A partition to partition joining technique is a technique where partition in the first database table is joined with the corresponding partition in the second database table.

In an exemplary embodiment, a conventional database management system is operable to use the repartition exchange operation to repartition data in Table A (which, for example, is partitioned on column a2) on column a1. Once Table A is repartitioned on column a1, a conventional database management system is operable to perform a join operation A|X|B on a1=b1.

Alternatively, a conventional DBMS is operable to execute a join operation using the serial query plan. In the serial query plan, a conventional DBMS reads all rows in the first database table, using a table scan operator, such as T_SCAN, which results in a large number of pages that are read and joined with the second database table. A person skilled in the art will appreciate that the serial operation, such as T_SCAN, is inefficient, particularly in a DBMS where table sizes are large.

Unlike a conventional DBMS, in an embodiment, DBMS 240 is operable to join database tables by using the Repartition Index Scan operator or RI_SCAN operator. The RI_SCAN operator is operable to join database tables without reading all data in the database table in order to perform a re-partitioning operation. Additionally, DBMS 240 is operable to execute RI_SCAN operation in parallel. As a result, in an embodiment, optimizer 266 is operable to use RI_SCAN operator and generate the query plan that increases system performance and response time.

2. RI_SCAN Operator

In an embodiment, the RI_SCAN operator is operable to join database tables without using a repartition exchange operation. In an embodiment, DBMS 240 is operable to use the RI_SCAN operator to join database tables that are partitioned on different attributes. In another embodiment, only one database table may be partitioned.

In an embodiment, DBMS 240 is operable to use RI_SCAN on database tables where the first table, such as Table A, includes a global index. In an embodiment, the global index is defined on the columns that are indicated by the join operation, such as, for example a1=b1. Thus, in an exemplary embodiment, the global index is defined on column a1.

In an embodiment, DBMS 240 uses the RI_SCAN operator to execute the join operation on Table A and Table B, such as A|X|B on a1=b1. In an embodiment, RI_SCAN operator scans the global index, such as the global index defined on column a1 in Table A, while using the characteristics of Table B. In another embodiment, Table A, may or may not be partitioned on one or more columns.

In an embodiment, the second table is partitioned into K partitions on the attribute that is relevant to the join operation. For example, Table B is partitioned on column b1 and includes K partitions.

In an embodiment, DBMS 240 uses K threads to scan the global index of the first table, such as Table A. Each thread (i)∈thread (1) ... thread (k) determines the rows in first table, such as Table A, that correspond to the partition (i)∈partition (1) ... Partition (k) in the second table, such as Table B. Once RI_SCAN operation is complete, each thread (i) contains rows of Table A that may be joined with the database table partition (i) in Table B using the join (|X|) operation.

2.1 RI_SCAN Operator and Range Partitioning

Figure 3:
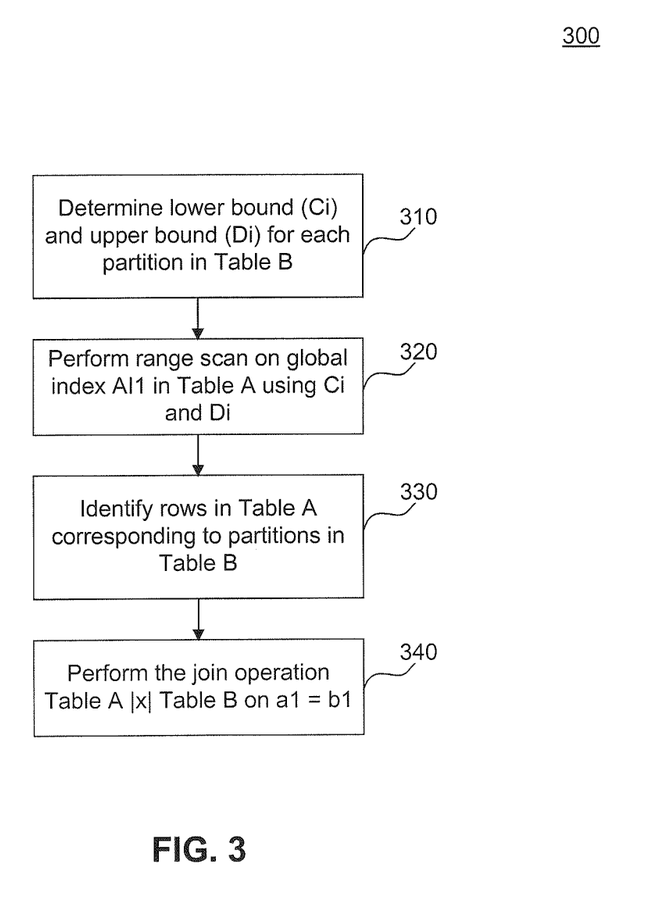
FIG. 3 is a flowchart 300 of an exemplary embodiment 300 illustrating the steps of executing a RI_SCAN operation for database tables partitioned using range partitioning.

FIG. 3 is a flowchart illustrating an exemplary embodiment 300 of DBMS 240 using the RI_SCAN operator to determine rows of Table A that may be joined with database table partitions in Table B.

As described above, Table A includes columns a1 through aN. Table A also includes a global index (AI1) that is defined on column a1. In an embodiment, Table A may be partitioned on one or more columns, or Table A may not be partitioned. A person skilled in the relevant art will appreciate that in an embodiment where Table A and Table B are partitioned on the same attribute or column using the same partitioning scheme and is a subset of the joining attributes, Table A and Table B may be joined without the RI_SCAN operation or any repartition operation.

Table B includes columns b1 through bN. In an embodiment, Table B is partitioned on column b1. In an embodiment, Table B is partitioned into K partitions, where partition (i)∈partition(1) ... partition (k). In an embodiment, Table B is partitioned using range partitioning.

In a parallel system environment, DBMS 240 executes RI_SCAN operation on TABLE A using K threads. Each thread is designated as thread (i) ∈ thread (1) ... Thread (k). In an embodiment, the number of threads that execute RI_SCAN in parallel Table A correspond to the number of partitions in Table B.

At step 310, each thread (i) determines the lower bound (Ci) and upper bound (Di) for the corresponding partition (i) in Table B.

At step 320, each thread (i) performs a range scan operation on global index AI1. The thread(i) performs this range scan operation using the lower bound (Ci) and upper bound (Di) obtained in step 310. When the thread (i) performs the range scan operation using lower bound (Ci) and upper bound (Di), the thread (i) is operable to determine whether the range in Table A particular to that thread (i) includes the rows that may be joined with Table B.

At step 330, DBMS 240 analyzes the result of the range scan operation of step 320. Step 330 may be performed in conjunction with step 320. After the range scan operation is complete, the thread(i) identifies rows in Table A that are within the same range as rows in the corresponding partition (i) in Table B.

At step 340, DBMS 240 proceeds to join rows in each thread (i) of Table A with the corresponding partition (i) of Table B on a1=b1.

2.2 RI_SCAN Operator and Hash Partitioning

Figure 4:
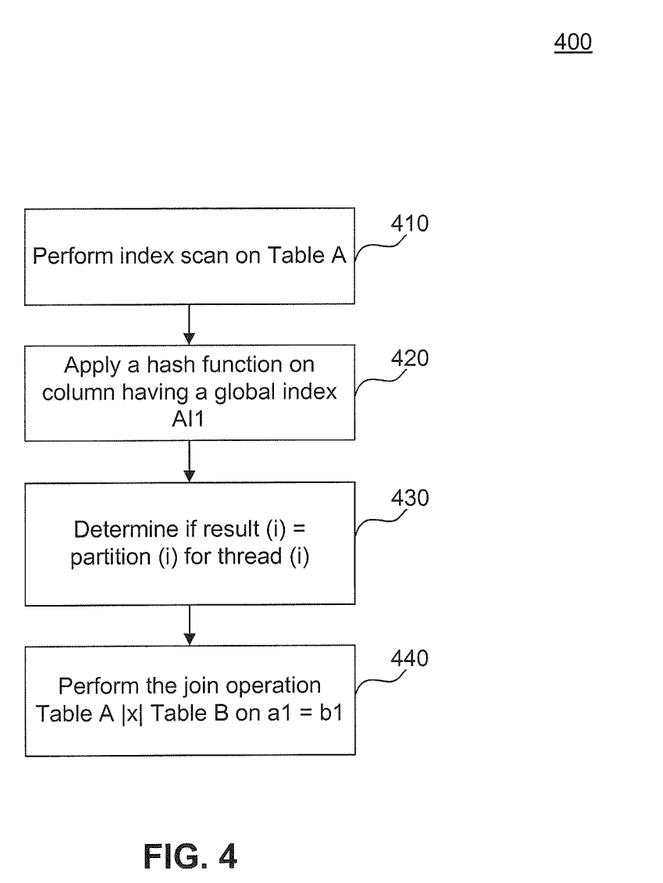
FIG. 4 is a flowchart 400 of an exemplary embodiment 400 illustrating the steps of executing a RI_SCAN operation for database tables partitioned using hash partitioning.

FIG. 4 is a flowchart illustrating an exemplary embodiment 400 of DBMS 240 using the RI_SCAN operator to determine rows of Table A that may be joined with the partitioned Table B, using hash partitioning.

As described in an exemplary embodiment herein, Table A includes columns a1 through aN. Table A also includes global index (AI1) on column a1. In an embodiment, Table A, may be partitioned on more than one column or Table A may not be partitioned.

Also, as described herein, Table B includes columns b1 through bN. In an embodiment, Table B is partitioned on column b1 into K partitions, where partition (i)∈partition (1) . . . partition (k). In an embodiment, Table B is partitioned using hash partitioning.

At step 410, each thread (i) performs the global index scan on global index AI1

At step 420, as the global index is scanned, DBMS 240 applies the hash function on each row of the index. Step 420 may be performed in conjunction with step 410. As descried herein, the hash function generates a result that corresponds to the value of "i" in each partition (i) of Table B.

At step 430, DBMS 240 analyzes the result of the hash function applied in step 420. If the result of the hash function, such as the value of "i", matches the partition (i) in Table B, then DBMS 240 determines that the row in Table A may be joined with a row in the corresponding partition (i) in Table B. If the value of "i" does not match the partition (i), the global index scan proceeds to the next index row of index AI1. In an exemplary embodiment, if the hash function applied in step 420 returns result=0, thread (0) determines that the corresponding row in Table A may be joined with the row in partition (0) in Table B. If the result≠0, the global index scan proceeds to the next index row of index AI1.

At step 440, DBMS 240 performs a join operation (|X|) on Table A and Table B where the data from Table A scanned by each thread (i) is joined with partition (i) in Table B.

3. Conditions for Performing RI_SCAN

DBMS 240 is operable to use multiple operators to perform a join operation between database tables. In an embodiment, DBMS 240 determines an operator, such as RI_SCAN based on the characteristics of the database tables. Characteristics of the database tables, include, but are not limited to, database table partitions, the local and global indexes, the column that the local and global indexes are defined on, the size of the database table, etc.

Figure 5:
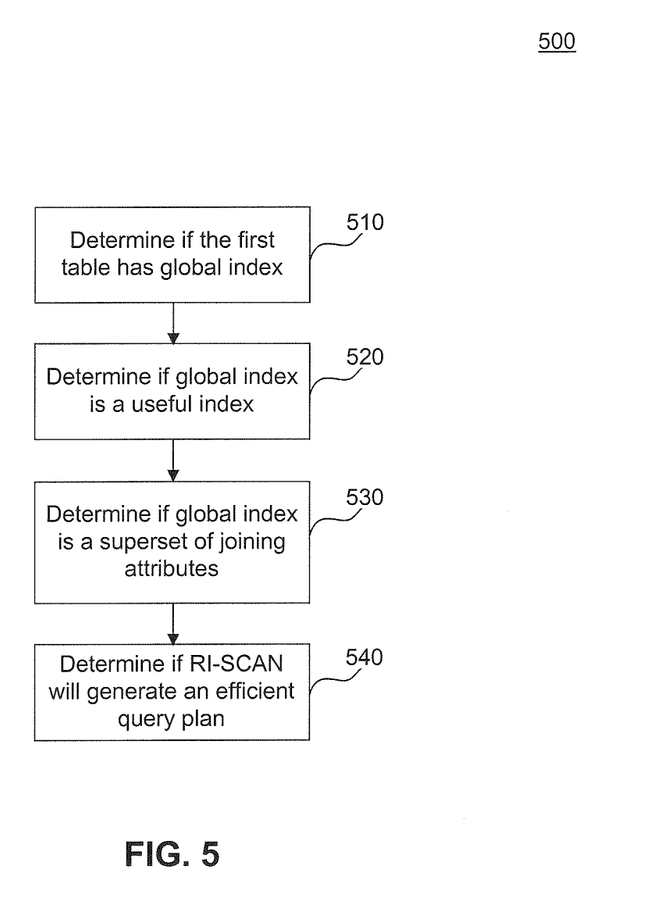
FIG. 5 is a flowchart 500 of an exemplary embodiment 500 illustrating the conditions for a RI_SCAN operation.

FIG. 5 describes conditions when DBMS 240 is likely to use the RI_SCAN operator on Table A in the join operation, in an embodiment. Steps 520-530 may be performed in any order. Also, step 540 is optional and depends on the characteristics of the DBMS, such as, DBMS 240.

At step 510, DBMS 240 determines whether the database table that is being joined includes the global index. In the example described herein, assume Table A includes the global index.

At step 520, DBMS 240 determines whether the global index is a useful index. The global index is a useful index if the global index is defined on a relevant attribute. An attribute is relevant if DBMS 240 uses the attribute in the join operation (|X|). In an exemplary embodiment described herein, global index AI1 defined on column a1 is a useful index. Global index AI1 is a useful index because Table A and Table B are being joined on the predicate a1=b1. However, had the global index AI1 been defined on column a2, DBMS 240 would not consider the global index AI1 as the useful index.

In another embodiment, global index AI1 is defined on columns a1 and a2 of Table A. DBMS 240 receives a request to join A|X|B on a1=b1 and a2=b2. Global index AI1 is a useful index, as the index is defined on columns a1 and a2, which are the same columns that DBMS 240 joins with Table B.

At step 530, DBMS 240 determines if the global index of the first database table is a superset of the joining attributes. In an exemplary embodiment, global index AI1 is defined on columns a1, a2 and a3 in Table A. Table B is partitioned on columns b1 and b2. DBMS 240 receives a request to join A|X|B on a1=b1 and a2=b2. Because global index AI1 is a superset of joining attributes a1 and a2, RI_SCAN operator is operable to determine the data in Table A that corresponds to the partitions in Table B as described above.

At step 540, DBMS 240 determines whether the RI_SCAN operator is an optimal operator to join the database tables. DBMS 240 analyzes the available system resources such as, but not limited to, the size of the database tables, size of the index, availability of the CPU, availability of physical and virtual memory, etc.

In an embodiment, query optimizer 266 determines whether to use the RI_SCAN or another operator, such as a repartition exchange operation for the join according to the following example algorithm. However, such operation is generally system dependent, so the invention is not limited to this example algorithm. Other algorithms for achieving this function will be apparent to persons skilled in the art, and the scope and spirit of embodiments of the invention include those other algorithms.

Let: Plan A be the cost of executing a conventional repartition exchange operation and Plan B be the cost of executing a Repartitioned Index Scan.

Plan A: Repartition Exchange

Plan B: Repartition Index Scan

Let: n denote the partition degree of Plan A and Plan B;

Let: (alpha) α=idxrowsize/datarowsize denote the width of the index. In an embodiment, if the α is less than a predefined value, such as ⅛, DBMS 240 is operable to use RI_SCAN to join the database tables;

Let: npages (A) denote the number of data pages in table A;
Let: nrows (A) denote the number of rows in table A;
Let: repartxchgcost (A)=2*{npages (A)*LIO+nrows (A)*CPU};
Let: idxscan (A)=α*npages (A)*LIO+α*npages (A)*PIO;

In an embodiment, LIO is the cost of retrieving data that is stored in a memory cache, PIO is the cost of retrieving data that is stored in main memory 130 and CPU is the cost of processing the retrieved data;

Let:

Cost(Plan A)=idxscancost(A)+piocost(A)+repartxchgcost(A)+nljcost{includes the cost of lookup on B};

Cost(Plan B)=n*idxscancost(A)+picost(A)+nljcost{includes the cost of lookup on B};

Let: Plan B be better than Plan A if Cost (Plan B) is less than Cost (Plan A);

$$\rightarrow \text{Cost (Plan } B) < \text{Cost (Plan } A);$$

$$\rightarrow (n-1) * idxscancost(A) < repartxchgcost(A);$$

$$\rightarrow (n-1) * idxscancost(A) / repartxcghcost(A) < 1;$$

$$\rightarrow \frac{\{(n-1)*(\alpha*npages(A)*LIO + \alpha*npages(A)*PIO)\}}{\{2*(npages(A)*LIO + nrows(A)*CPU)\}} < 1;$$

$$\rightarrow \frac{\alpha*npages(A)*\{(n-1)*LIO + PIO\}}{2*\{npages(A)*LIO + (npages(A)/datarowsize)*CPU\}} < 1;$$

$$\rightarrow \frac{\alpha*npages(A)*\{(n-1)*LIO + PIO\}}{2*npages(A)\{LIO + CPU/datarowsize\}} < 1;$$

$$\rightarrow \frac{\alpha*\{(n-1)*LIO + PIO\}}{2*\{(CPU + LIO*datarowsize)/datarowsize)\}} < 1;$$

$$\rightarrow \frac{\alpha*datarowsize*\{(n-1)*LIO + PIO\}}{2*\{CPU + LIIO*datarowsize\}} < 1;$$

$$\rightarrow \frac{idxrowsize*\{(n-1)*LIO + PIO\}}{2*\{CPU + LIO*datarowsize\}} < 1;$$

In an embodiment, the cost of the LIO=2, CPU=0.1 and PIO=25. However, the cost for the LIO, CPU and PIO may vary with the computing device that operates DBMS 240.

$$\rightarrow \frac{idxrowsize*\{(n-1)*2 + 25\}}{2*(0.1 + 2*datarowsize)} < 1;$$

In an embodiment, the equation above may be estimated as:

$$\rightarrow \frac{idxrowsize*\{2*(n+12)\}}{2*2*datarowsize} < 1;$$

$$\rightarrow \frac{\alpha*(n+12)}{2} < 1;$$

$$\rightarrow \alpha < 2/(n+12).$$

In an embodiment, if the value of n=1, α<2/13 or approximately 1/7. Because, in the example described herein α>1/8, query optimizer 266 is likely to choose another operator to join the database tables.

CONCLUSION

It is to be appreciated that the Detailed Description section, and not the Summary and Abstract sections, is intended to be used to interpret the claims. The Summary and Abstract sections may set forth one or more but not all exemplary embodiments of the invention as contemplated by the inventor(s), and thus, are not intended to limit the invention and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the specification is to be interpreted by the skilled artisan in light of the teachings and guidance.

The breadth and scope of the invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A method for joining database tables, comprising:
   defining a global index on a first database table based on a requested join operation between the first database table and a second database table, wherein the first and second database tables are stored in a memory, wherein defining the global index further comprises:
   identifying partition characteristics of a column in the second database table; and
   defining the global index in the first database table based on the partition characteristics of the column in the second database table;
   determining a number of partitions in the second database table;
   performing an index scan on the global index of the first database table, using a number of threads executing in parallel, wherein the number of threads corresponds to the number of partitions in the second database table;
   determining rows in the first database table that may be joined with partitions in the second database table based on the performed index scan; and
   joining each of the determined rows in the first database table with corresponding partitions in the second database table.

2. The method of claim 1, wherein the global index is a useful index.

3. The method of claim 1, wherein the global index includes a superset of joining attributes.

4. The method of claim 1, wherein the second database table is partitioned using range partitioning.

5. The method of claim 4, wherein at least one thread determines a lower bound and an upper bound of at least one partition in the second database table and applies the lower bound and the upper bound to the index scan performed on the first database table.

6. The method of claim 1, wherein the second database table is partitioned using hash partitioning.

7. The method of claim 6, wherein a hash function is applied to the global index in the first database table and a result of the hash function associates a row in the first database table with a partition in the second database table.

8. A database management system for joining database tables, comprising:
a memory;
a processor communicatively coupled to the memory; and
an optimization module configured to:
define a global index of a first database table based on a requested join operation between the first database table and a second database table, wherein to define the global index the optimization module is further configured to:
identify partition characteristics of a column in the second database table; and
define the global index in the first database table based on the partition characteristics of the column;
determine a number of partitions in the second database table;
perform an index scan on the global index of the first database table, using a number of threads executing in parallel, wherein the number of threads corresponds to the number of partitions in the second database table;
determine rows in the first database table that may be joined with partitions in the second database table based on the performed index scan; and
join each of the determined rows in the first database table with corresponding partitions in the second database table,
and wherein the optimization module is stored in the memory and executes on the processor.

9. The system of claim 8, wherein the optimization module is configured to join database tables partitioned using range partitioning.

10. The system of claim 8, wherein the optimization module is configured to join database tables partitioned using hash partitioning.

11. The system of claim 8, wherein the optimization module is configured to determine whether the global index is a useful index.

12. The system of claim 8, wherein the optimization module is configured to determine whether the global index includes a superset of attributes in the first database table.

13. The database system of claim 8, further comprising a receiver configured to receive a query requesting a join operation from a client.

14. An article of manufacture including a non-transitory computer-readable medium having instructions stored thereon that, when executed by a computing device, cause said computing device to perform operations comprising:
defining a global index on a first database table based on a requested join operation between the first database table and a second database table, wherein the first and second database tables are stored in a memory, wherein defining the global index farther comprises:
identifying partition characteristics of a column in the second database table; and
defining the global index in the first database table based on the partition characteristics of the column in the second database table;
determining a number of partitions in the second database table;
performing an index scan on the global index of the first database table, using a number of threads executing in parallel, wherein the number of threads corresponds to the number of partitions in the second data base table;
determining rows in the first database table that may be joined with partitions in the second database table based on the performed index scan; and
joining each of the determined rows in the first database table with corresponding partitions in the second database table.

15. The article of manufacture of claim 14, wherein the second database table is partitioned using range partitioning.

16. The article of manufacture of claim 15, wherein at least one thread determines a lower bound and an upper bound of at least one partition in the second database table and applies the lower bound and the upper bound to the index scan performed on the first database table.

17. The article of manufacture of claim 14, wherein the second database table is partitioned using hash partitioning.

18. The article of manufacture of claim 17, wherein a hash function is applied to the global index in the first database table and the result of the hash function associates a row in the first database table with a partition in the second database table.

* * * * *